United States Patent [19]

Asaro

[11] 4,114,561
[45] Sep. 19, 1978

[54] AVALANCHE RESCUE MARKER SYSTEM

[76] Inventor: Vito F. Asaro, 600 B St., #600, San Diego, Calif. 92101

[21] Appl. No.: 622,473

[22] Filed: Oct. 15, 1975

[51] Int. Cl.² .............................................. B64B 1/52
[52] U.S. Cl. ........................ 116/124 B; 116/DIG. 8; 116/DIG. 9
[58] Field of Search ...... 116/124 B, DIG. 8, DIG. 9; 9/9; 244/31, 32, 33

[56] References Cited

U.S. PATENT DOCUMENTS

| | | | |
|---|---|---|---|
| 1,372,260 | 3/1921 | Wilkin | 244/31 |
| 1,605,343 | 11/1926 | Gould | 9/9 |
| 2,646,019 | 7/1953 | Chetlan | 116/124 B |
| 2,923,917 | 2/1960 | McPherson | 116/124 B |
| 3,381,655 | 5/1968 | Rozzelle | 116/124 B |
| 3,592,157 | 7/1971 | Schwartz | 116/124 B |

FOREIGN PATENT DOCUMENTS 504,878  12/1954  Italy ......................................... 244/31

*Primary Examiner*—S. Clement Swisher
*Assistant Examiner*—Denis E. Corr

[57] ABSTRACT

An avalanche rescue marker system consisting of an openable pack assembly and a trigger inflation assembly, the openable pack assembly being carried by the user on his upper back and the trigger inflation assembly being carried by the user on an upper front portion of his outer garment with a gas tube coupled therebetween. The trigger inflation assembly carries a gas cylinder having compressed lighter-than-air gas therein and is coupled to the input of a deflated marker balloon which in turn has its neck portion coupled tethered to a tether which is folded in anti-fouling loops. When a lever is pulled by the wearer the gas in the cartridge enters the balloon, inflating the balloon after which the balloon automatically escapes, pulling the tether upward along with it. The tether is attached to the wearer and hence, the balloon becomes a marker marking the location of the wearer.

2 Claims, 7 Drawing Figures

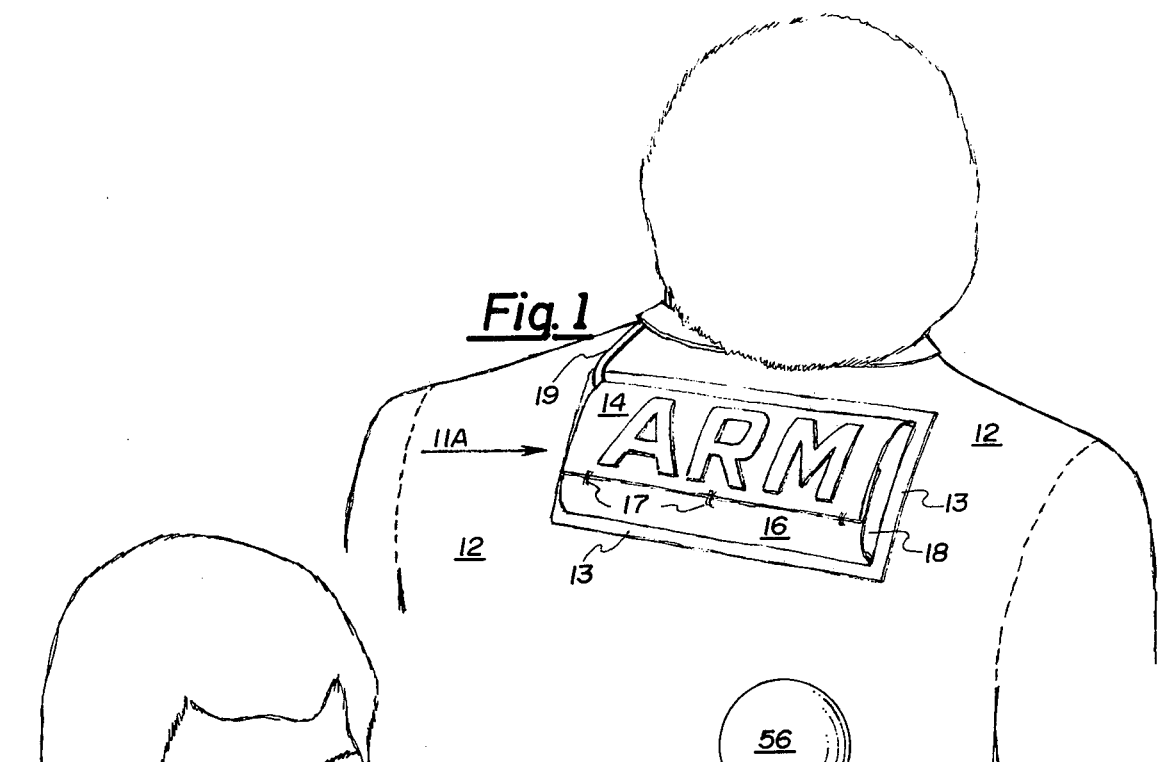
Fig. 1
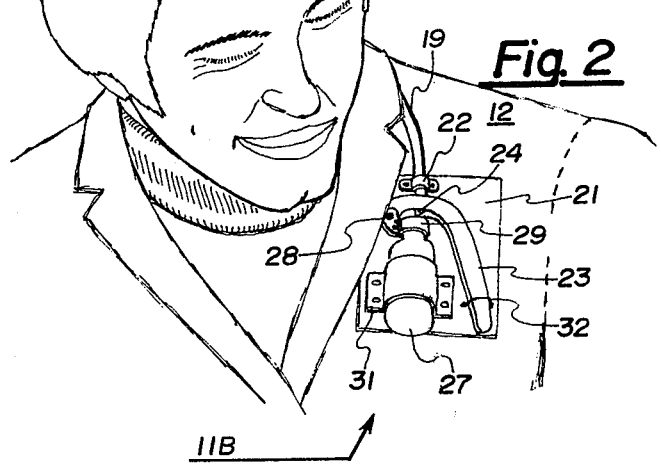
Fig. 2
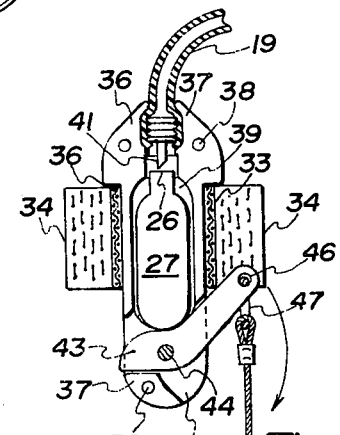
Fig. 3
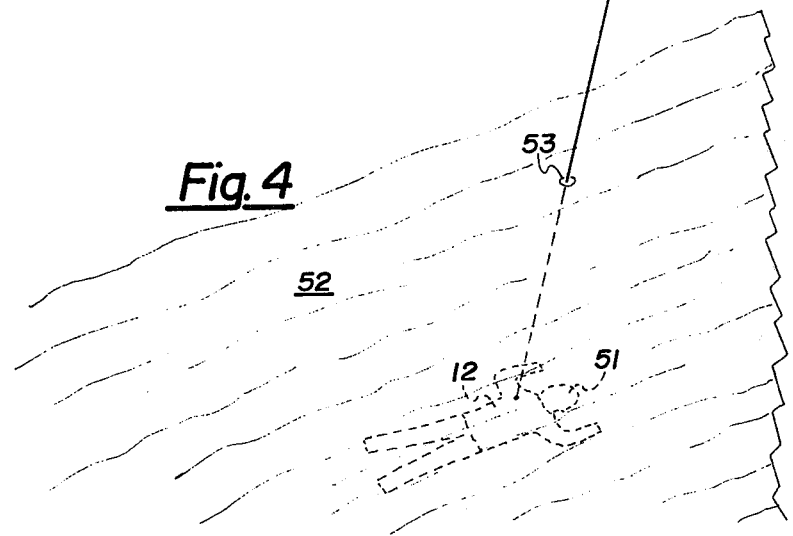
Fig. 4
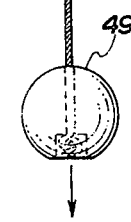

AVALANCHE RESCUE MARKER SYSTEM

BRIEF DESCRIPTION OF THE INVENTION

According to the invention, an openable pack assembly containing a tethered balloon with a tether folded in an antifouling fashion is placed on the back of a wearer via an openable pack. The pack can be sewn or attached as by Velcro tape, etc. A trigger inflation assembly is attached to the front portion of the wearer containing a gas cylinder with compressed lighter-than-air gas therein and a flexible gas tube coupling the gas cartridge to the balloon. A lever in the trigger inflation assembly punctures the gas cylinder, inflates the balloon, and releases the tethered balloon (the other end of the tether is coupled to the pack). Hence, when the wearer senses an oncoming avalanche, he merely pulls the triggering mechanism on the trigger inflation assembly which automatically inflates the balloon which is automatically released (the details of which will be explained below), carrying with it a tether attached to the wearer. Naturally, the invention can be utilized in other emergency situations, such as mountain climbers breaking legs, etc.

An object of the present invention is the provision of an improved rescue marker system.

Another object of the invention is the provision of an improved avalanche rescue marker system.

Yet another object of the invention is the provision of a rescue marker system which can be rapidly actuated.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein:

FIG. 1 is a perspective view of the openable pack portion of the invention in situ;

FIG. 2 is a perspective view of the trigger inflation assembly in situ;

FIG. 3 is a side elevational view partially in section of the trigger mechanism of the embodiment of FIGS. 1 and 2;

FIG. 4 is a schematic representation of the embodiment of FIGS. 1 and 2 after actuation;

DETAILED DESCRIPTION OF THE DRAWING

Figure 5:
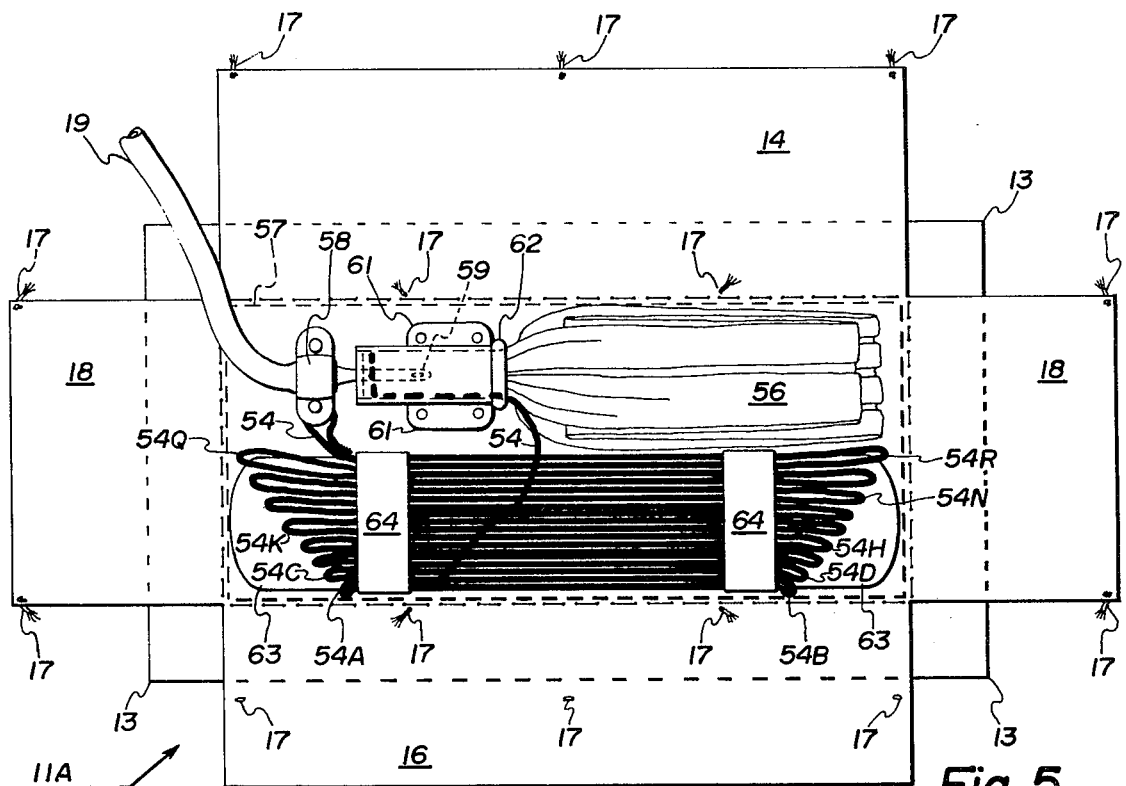
FIG. 5 is a schematic representation of the embodiment of FIG. 1 in an opened condition.

Referring to FIGS. 1 and 2, the invention comprises two separate cooperative assemblies, an openable pack 11A and a trigger inflation assembly 11B. An alternate configuration of the trigger inflation assembly is indicated as 11B[1]. FIG. 1 shows the openable pack 11A attached to a jacket 12 in a position slightly below the neck. Attachment is effected by means of base layer 13 which may be either glued or sewn to jacket 12 and to which is attached an upper flap 14 which overlaps a lower flap 16 and is temporarily attached thereto by break-away thread loops 17. Two end flaps 18 are tucked underneath the upper flap 14 and lower flap 16. A thick-walled gas tube 19 is shown emerging from openable pack 11A and passing over the shoulder of jacket 12.

Trigger inflation device 11B in FIG. 2 comprises an attachment flap 21 which may be either bonded or sewn to jacket 12 and to which is attached a positioning arch 22 which slidably positions thick-walled gas tube 19 which is captivated within the upper portion of trigger handle 23 and terminates in a hollow penetrating needle 24 which is also captivated to trigger handle 23 and is positioned above a penetrable end seal 26 (not shown) of gas cylinder 27. Trigger handle 23 which is a lever is attached at pivot 28 to a cylinder neck clamp 29. Cylinder 27 is held captive to attachment flap 21 by cylinder band 31. Trigger handle 23 is temporarily positioned on attachment flap 21 by means of a breakable loop 32.

Referring to FIG. 3, an alternate embodiment of the trigger inflation device 11B[1] comprises a captivating band 33, shown in cross section, which is permanently attached to attachment flaps 34. The captivating band 33 encircles cylinder holder 36 representing the inner half of a cylinder container, the outer half 36[1] (not shown) having been removed to demonstrate the internal operation of the device. The outer half of the cylinder holder 36[1] is a mirror image of the inner half 36 and both contain mating flaps 37 in three locations complete with attachment apertures 38. When the two halves are mated and attached, they cooperate to form an internal cavity 39, the upper portion of which cooperates with a gripable penetrating needle 41 to captivate the thick-walled gas tube 19 previously referred to in FIG. 1. By this same configuration, the gripable penetrating needle 41 is properly centered above the penetrable end seal 26 of gas cylinder 27 which is slidably disposed within internal cavity 39. The lower portion of cylinder holder 36 is provided with a clearance flap 42 which is capable of receiving without slidable interference a cam lever 43 through which passes a removable cam pivot 44 shown here in cross section. Cam lever 43 is equipped near its outer extremity with a link aperture 46 through which passes a rotatable link 47 which is coupled to trigger lanyard 48 which terminates in trigger knob 49. Hence, pulling cam lever 43 to rotate as indicated causes the short projection of cam lever 43 to raise the gas cylinder 27 within cavity 39, causing the penetrable end seal 26 of cylinder 27 to be penetrated by the gripable penetrating needle 41, the hollow center of which communicates with thick-walled gas tube 19.

Referring to FIG. 4, a victim 51 is buried on an avalanche-covered hillside 52. His position being indicated by the snow entry point 53 of a brightly colored tether 54 which is connected to a brightly colored marker balloon 56.

Referring to FIG. 5, the base layer 13 is sewn to the remainder of the pack cloth arrangement shown as upper flap 14, lower flap 16, and end flaps 18, respectively. In the cavity between base layer 13 and the remainder of the cloth elements is a semi-rigid base 57 to which is connected needle clamp 58 which clamps the thick-walled gas tube 19 around an inflation needle 59 and positions it in the center of the tube attachment 61 which locates a balloon restraining tube 62. Balloon 56 is folded and to the right of restraining tube 62 through which the end of the balloon is inserted around inflation needle 59. To the semirigid base 57 is also attached in its central area a semi-rigid tether board on which the full length of tether 54 is arrayed. Elastic tether retainers 64 hold tether loops 54A and 54R in position for snag-proof deployment.

Figure 6:
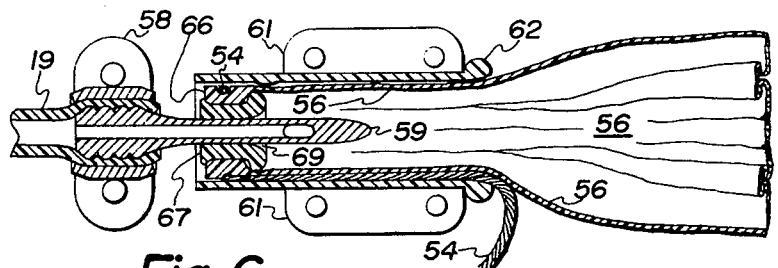
FIG. 6 is a detail partially sectioned of the inflating mechanism of FIG. 5.

Referring to FIG. 6, thick-walled gas tube 19 is clamped around the inflation needle 59 by means of needle clamp 58. Balloon 56 is shown with a reinforced balloon end 66 inserted in restraining tube 62 and to the reinforced end is permanently attached the end of tether 54 which adds additional strength to balloon end 66 and enables it to firmly be bonded to inflation valve body 67 which contains at the inner end inflation valve lips 68 which are made of highly pliable elastic that is stretched open by insertion needle 59. When insertion needle 59 is withdrawn, the inflation valve lip 68 entirely closes and seals inflation orifice 69.

Figure 7:
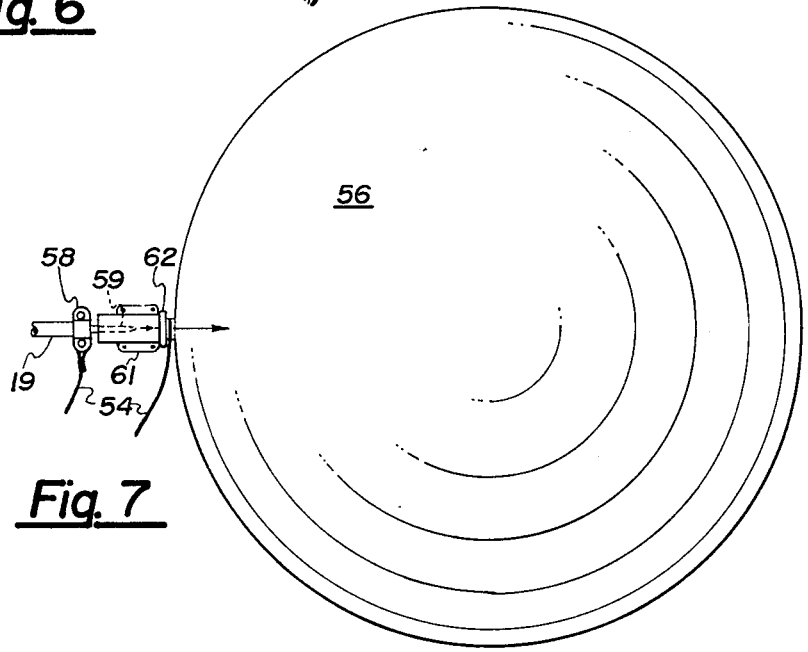
FIG. 7 is a view of the inflating mechanism of FIGS. 5 and 6 with a marker balloon substantially inflated.

Referring to FIG. 7, it is apparent that as compressed lighter-than-air gas enters through thick-walled gas tube 19 and through inflation needle 59 into balloon marker 56, balloon marker 56 will expand and at the last phase of expansion will firmly pull the reinforced balloon end 66 off of the end of inflation needle 59 causing the inflation valve lips 68 to close around the inflation orifice 69. The lighter-than-air gas causes marker balloon 56 to rise, pulling loose in sequence the various loops of tether 54 until the last loop has been freed and tether 54 is firmly attached between the marker balloon 56 and the needle clamp 58 which is firmly and permanently attached to a semi-rigid base 57. The configuration of loops on tether 54A is of primary importance as it prevents the snagging of the tether. As marker balloon 56 rises, it first pulls loose the short loop 54A, secondly a short loop 54B, thirdly a longer loop 54C on the left side, and then a longer loop 54D on the right side. Since every loop which is pulled is shorter than any other remaining loop in the array, it is not possible for the loop being pulled to tie around or snag with the longer loops which are adjacent to it.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:

1. A rescue marker system comprising:
An instantly openable pack assembly being carried on the back of an outer garment of a user, said openable pack assembly including an inflatable marker balloon, and a tether coupled to a neck portion of said marker balloon on one end thereof and to the openable pack assembly on another end thereof; an inflation assembly being carried on an upper front portion of said user's outer garment, said inflation assembly including a gas cylinder having compressed lighter-than-air gas therein, and a manually operated lever for activating puncturing means which means is operable for instant, one movement puncturing of said gas cartridge and inflation of said balloon; release means for automatically and instantly releasing said marker balloon after inflation thereof; and sealing means for sealing the lighter-than-air gas into said balloon upon release thereof.

2. The rescue marker system of claim 1 wherein:
said tether is carried in said openable pack assembly in a series of fold back loop layers with the first loop layer being the shortest and attached to the neck portion of the balloon and each succeeding layer being longer than the next preceding layer with the last layer being attached to said openable pack assembly.

* * * * *